United States Patent
Siddique

(10) Patent No.: US 12,519,843 B2
(45) Date of Patent: Jan. 6, 2026

(54) TEXT MESSAGE NOTIFICATION FOR MULTIMEDIA SESSION AVAILABILITY IN WIRELESS COMMUNICATION NETWORKS

(71) Applicant: T-MOBILE INNOVATIONS LLC, Overland Park, KS (US)

(72) Inventor: Zaheer Mohammed Siddique, Overland Park, KS (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 112 days.

(21) Appl. No.: 18/345,604

(22) Filed: Jun. 30, 2023

(65) Prior Publication Data

US 2025/0007960 A1    Jan. 2, 2025

(51) Int. Cl.
*H04L 65/1016*  (2022.01)
*H04L 65/1069*  (2022.01)
*H04L 65/1073*  (2022.01)
*H04W 4/12*  (2009.01)

(52) U.S. Cl.
CPC ...... *H04L 65/1016* (2013.01); *H04L 65/1069* (2013.01); *H04L 65/1073* (2013.01); *H04W 4/12* (2013.01)

(58) Field of Classification Search
CPC ............. H04L 65/1016; H04L 65/1069; H04L 65/1073; H04W 4/12
See application file for complete search history.

(56) References Cited

U.S. PATENT DOCUMENTS

| | | | |
|---|---|---|---|
| 8,644,807 B2 | 2/2014 | Wisebourt et al. | |
| 9,667,769 B2 | 5/2017 | Clarke et al. | |
| 10,673,970 B2 | 6/2020 | Dotan-Cohen et al. | |
| 10,721,594 B2 | 7/2020 | Bose et al. | |
| 2015/0172877 A1 | 6/2015 | Wang | |
| 2015/0326619 A1* | 11/2015 | Lau | H04L 65/1073 370/328 |
| 2020/0359179 A1* | 11/2020 | Shah | G06F 16/9566 |
| 2021/0314369 A1* | 10/2021 | Lee | H04L 65/1059 |
| 2022/0385722 A1* | 12/2022 | Han | H04L 67/02 |
| 2023/0007449 A1* | 1/2023 | Mumick | G06Q 30/0241 |
| 2023/0188485 A1* | 6/2023 | Stafford | H04W 12/03 709/206 |
| 2023/0269661 A1* | 8/2023 | Xu | H04W 36/0011 370/328 |

* cited by examiner

*Primary Examiner* — Kostas J Katsikis

(57) ABSTRACT

Various embodiments comprise wireless communication network to notify user devices of user availability. In some examples, the wireless communication network comprises multimedia circuitry. The multimedia circuitry receives a multimedia registration request from a terminating user device and registers the terminating user device for multimedia services. The multimedia circuitry correlates the multimedia registration of the terminating user device with a multimedia session request received from an originating user device. The multimedia circuitry transfers a notification for delivery to the originating user device that indicates an availability of the terminating user device.

20 Claims, 10 Drawing Sheets

TEXT MESSAGE NOTIFICATION FOR MULTIMEDIA SESSION AVAILABILITY IN WIRELESS COMMUNICATION NETWORKS

TECHNICAL FIELD

Various embodiments of the present technology relate to Internet Protocol Multimedia Subsystem (IMS), and more specifically, to detecting and indicating user availability.

BACKGROUND

Wireless communication networks provide wireless data services to wireless user devices. Exemplary wireless data services include machine-control, internet-access, media-streaming, online gaming, and social-networking. Exemplary wireless user devices comprise phones, computers, vehicles, robots, and sensors. Radio Access Networks (RANs) exchange wireless signals with the wireless user devices over radio frequency bands. The wireless signals use wireless network protocols like Fifth Generation New Radio (5GNR), Long Term Evolution (LTE), Institute of Electrical and Electronic Engineers (IEEE) 802.11 (WIFI), and Low-Power Wide Area Network (LP-WAN). The RANs exchange network signaling and user data with network elements that are often clustered together into wireless network cores over backhaul data links. The core networks execute network functions to provide wireless data services to the wireless user devices.

An Internet Protocol Multimedia Subsystem (IMS) delivers Internet Protocol (IP) multimedia services like voice calling and video conferencing to wireless user devices. The IMS distributes IP addresses to the wireless user devices to facilitate communications between the wireless user devices. The IMS interfaces with wireless network cores to exchange Session Initiation Protocol (SIP) messages with the wireless user devices to communicate with the wireless user devices. The IMS comprises network functions and network elements like Call Session Control Function (CSCF), Telephony Application Server (TAS), and Short Message Service Application Server (SMS AS).

To initiate a voice call with another wireless user device, a calling user device transfers a call request for the called user device to the IMS. The IMS routes the call request to the called user device and organizes the wireless network resources to establish an end-to-end connection between the called user device and the called user device. The wireless user devices may then participate in a voice call over the end-to-end connection. Wireless user devices are not always able to participate in voice calls. For example, a user device may be powered off, set in do-not-disturb mode, lack coverage, be attached to a non-voice network, or be in some other scenario that inhibits the user devices from wirelessly exchanging data for a voice call. Unfortunately, wireless communication networks do not effectively or efficiently notify calling wireless user devices when called user devices become available to participate in voice calls.

OVERVIEW

This Overview is provided to introduce a selection of concepts in a simplified form that are further described below in the Technical Description. This summary is not intended to identify key features or essential features of the claimed subject matter, nor is it intended to be used as an aid in determining the scope of the claimed subject matter.

Various embodiments of the present technology relate to solutions to facilitate multimedia sessions between user devices. Some embodiments comprise a method of operating a wireless communication network to notify user devices of user availability. The method comprises receiving a multimedia registration request from a terminating user device and registering the terminating user device for multimedia services. The method further comprises correlating the multimedia registration of the terminating user device with a multimedia session request received from an originating user device. The method further comprises transferring a notification for delivery to the originating user device that indicates an availability of the terminating user device.

Some embodiments comprise a wireless communication network to notify user devices of user availability. The wireless communication network comprises multimedia circuitry. The multimedia circuitry receives a multimedia registration request from a terminating user device and registers the terminating user device for multimedia services. The multimedia circuitry correlates the multimedia registration of the terminating user device with a multimedia session request received from an originating user device. The multimedia circuitry transfers a notification for delivery to the originating user device that indicates an availability of the terminating user device.

Some embodiments comprise one or more non-transitory computer-readable storage media having program instructions stored thereon to notify user devices of user availability. When executed by a computing system, the program instructions direct the computing system to perform operations. The operations comprising receiving a multimedia registration request from a terminating user device and registering the terminating user device for multimedia services. The operations further comprise correlating the multimedia registration of the terminating user device with a multimedia session request received from an originating user device. The operations further comprise transferring a notification for delivery to the originating user device that indicates an availability of the terminating user device.

DESCRIPTION OF THE DRAWINGS

Many aspects of the disclosure can be better understood with reference to the following drawings. The components in the drawings are not necessarily drawn to scale. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

Figure 1:
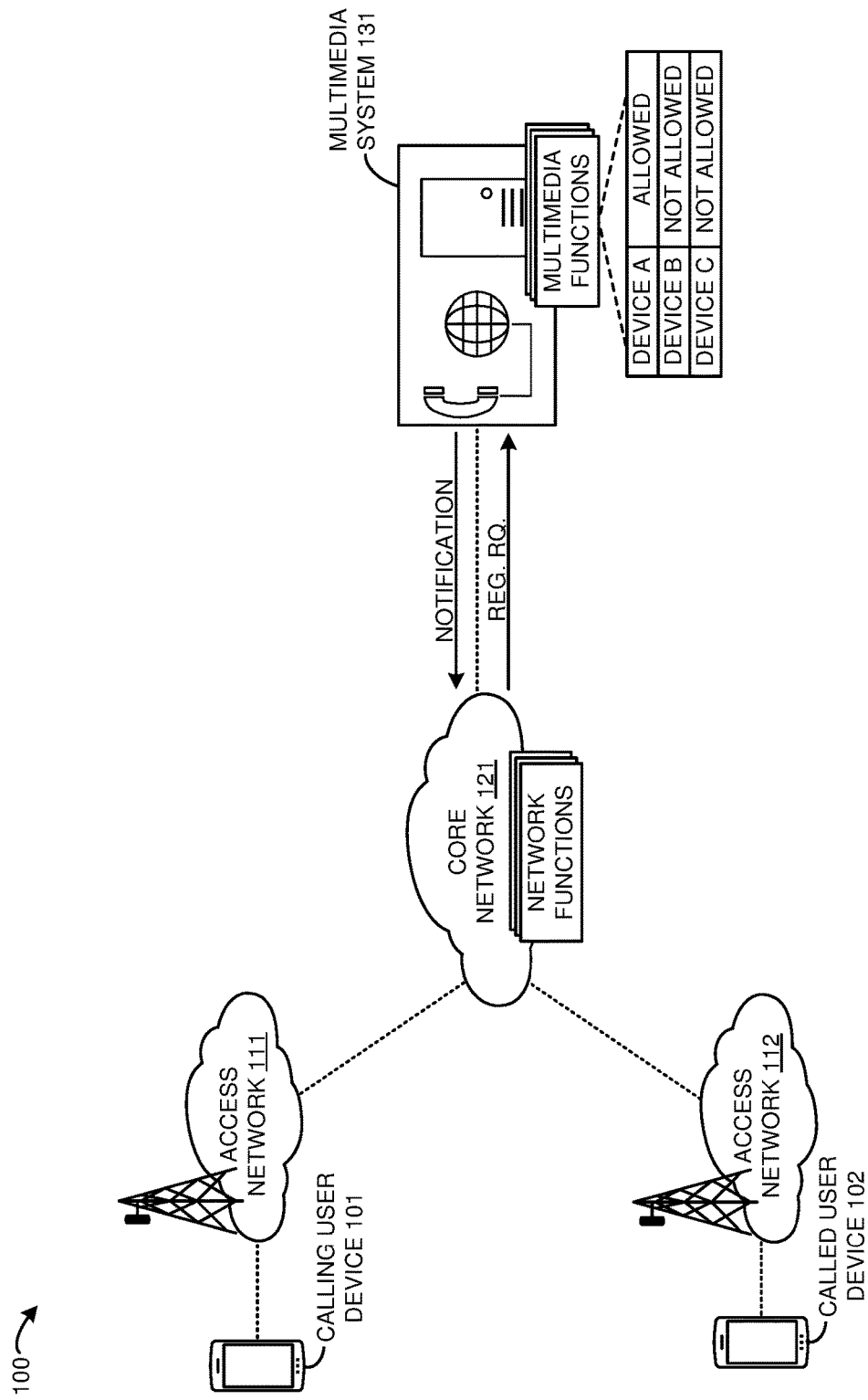
FIG. 1 illustrates a wireless communication network to notify a calling user device of a multimedia availability for a called user device.

The drawings have not necessarily been drawn to scale. Similarly, some components or operations may not be separated into different blocks or combined into a single block for the purposes of discussion of some of the embodiments of the present technology. Moreover, while the technology is amendable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

TECHNICAL DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

FIG. 1 illustrates wireless communication network 100 network to notify a calling user device of a multimedia availability for a called user device. Wireless communication network 100 delivers services like voice calling, text messaging, internet access, media streaming, machine communications, or some other wireless communications product to user devices. Wireless communication network 100 comprises user devices 101 and 102, access networks 111 and 112, core network 121, and multimedia system 131. User device 101 is representative of a calling user device and user device 102 is representative of a called user device. In other examples, wireless network communication network 100 may comprise additional or different elements than those illustrated in FIG. 1.

Various examples of network operation and configuration are described herein. In some examples, user device 101 attaches to access network 111 and registers for wireless data services with core network 121. Once registered on core network 121, user device 101 registers with multimedia system 131 for multimedia services like voice calling, video calling, text messaging, and the like. Registration typically involves confirming the identity of the registering user device and identifying what services the user device is authorized for. Once registered with multimedia system 131, user device 101 generates a multimedia session request for user device 102. The request may comprise a voice call request, video call request, or some other type of multimedia session request. User device 101 transfers the request to core network 121 over access network 111. Core network 121 interfaces with multimedia system 131 to deliver the session request to user device 102. For example, multimedia system 131 may provide routing information for user device 102 and core network 121 may transfer the multimedia request to user device 102 based on the routing information. Core network 121 attempts to deliver the request to user device 102 over access network 112. At this point, user device 102 is unreachable and core network 121 is unable to deliver the multimedia request. For example, user device 102 may be set in do-not-disturb mode, powered off, out of service range, participating in another call, be attached to a non-voice network or network slice, and the like. Core network 121 notifies user device 101 that the multimedia request could not be completed.

Subsequently, user device 102 attaches to access network 112 and registers for wireless data services with core network 121. Once registered on core network 121, user device 102 registers with multimedia system 131 for multimedia services. The multimedia functions hosted by multimedia system 131 correlate the registration of user device 102 with the multimedia request transferred by user device 101. The multimedia functions maintain a data structure that indicates user devices that that may be notified when user device 102 is available for multimedia services. As illustrated in FIG. 1, the data structure indicates device A is allowed to be notified while devices B and C and not allowed. In this example, the multimedia functions determine that user device 101 may be notified of user devices 102 network presence based on the data structure. Multimedia system 131 generates a notification indicating that user device 102 is available to participate in multimedia sessions. The notification may comprise a text message, a Short Message Service (SMS) message, a Rich Communication Services (RCS) message, and the like. Multimedia system 131 transfers the notification to user device 101 over core network 121 and access network 111. User device 101 receives and displays the notification that indicates the availability of user device 102.

Wireless communication network 100 provides wireless data services to user devices 101 and 102. Exemplary user devices include phones, computers, vehicles, robots, and sensors. Access networks 111 and 112 exchange wireless signals with user devices 101 and 102 over radio frequency bands. The wireless signals use wireless network protocols like Fifth Generation New Radio (5GNR), Long Term Evolution (LTE), Institute of Electrical and Electronic Engineers (IEEE) 802.11 (WIFI), and Low-Power Wide Area Network (LP-WAN). Access networks 111 and 112 are connected to core network 121 over backhaul data links. Access networks 111 and 112 exchange network signaling and user data with network elements in core network 121. Access networks 111 and 112 may comprise wireless access points, Radio Access Networks (RANs), internet backbone providers, edge computing systems, or other types of wireless/wireline access systems to provide wireless links to user devices 101 and 102, the backhaul data links, and edge computing services between user devices 101 and core network 121.

Access networks 111 and 112 may comprise Radio Units (RUs), Distributed Units (DUs) and Centralized Units (CUs). The RUs may be mounted at elevation and have antennas, modulators, signal processors, and the like. The RUs are connected to the DUs which are usually nearby network computers. The DUs handle lower wireless network layers like the Physical Layer (PHY), Media Access Control (MAC), and Radio Link Control (RLC). The DUs are connected to the CUs which are larger computer centers that are closer to core network 121. The CUs handle higher wireless network layers like the Radio Resource Control (RRC), Service Data Adaption Protocol (SDAP), and Packet Data Convergence Protocol (PDCP). The CUs are coupled to network functions in core network 121. Access networks 111 and 112 may also comprise RUs and Baseband Units (BBUs). The BBUs are nearby network computers and handle wireless network layers like RRC, PDCP, RLC, MAC, and PHY.

Core network 121 and multimedia system 131 are representative of computing systems that provide wireless data services to user devices 101 and 102 over access networks 111 and 112. Exemplary computing systems comprise data centers, cloud computing networks, and the like. The computing systems of core network 121 store and execute the network functions to provide wireless data services to user devices 101 over access network 111. Exemplary network functions include Access and Mobility Management Function (AMF), Session Management Function (SMF), User Plane Function (UPF), Unified Data Management (UDM), and Policy Control Function (PCF). The computing systems of multimedia system 131 store and execute multimedia functions to provide services like voice calling, video conferencing, and text messaging to user devices 101. Exemplary multimedia functions include Call Session Control Function (CSCF), Telephony Application Server (TAS), and RCS Application Server (RCS AS). Core network 121 may comprise a Fifth Generation Core (5GC) architecture and/or an Evolved Packet Core (EPC) architecture. Multimedia system 131 may comprise an Internet Protocol Multimedia Subsystem (IMS) architecture.

Figure 2:
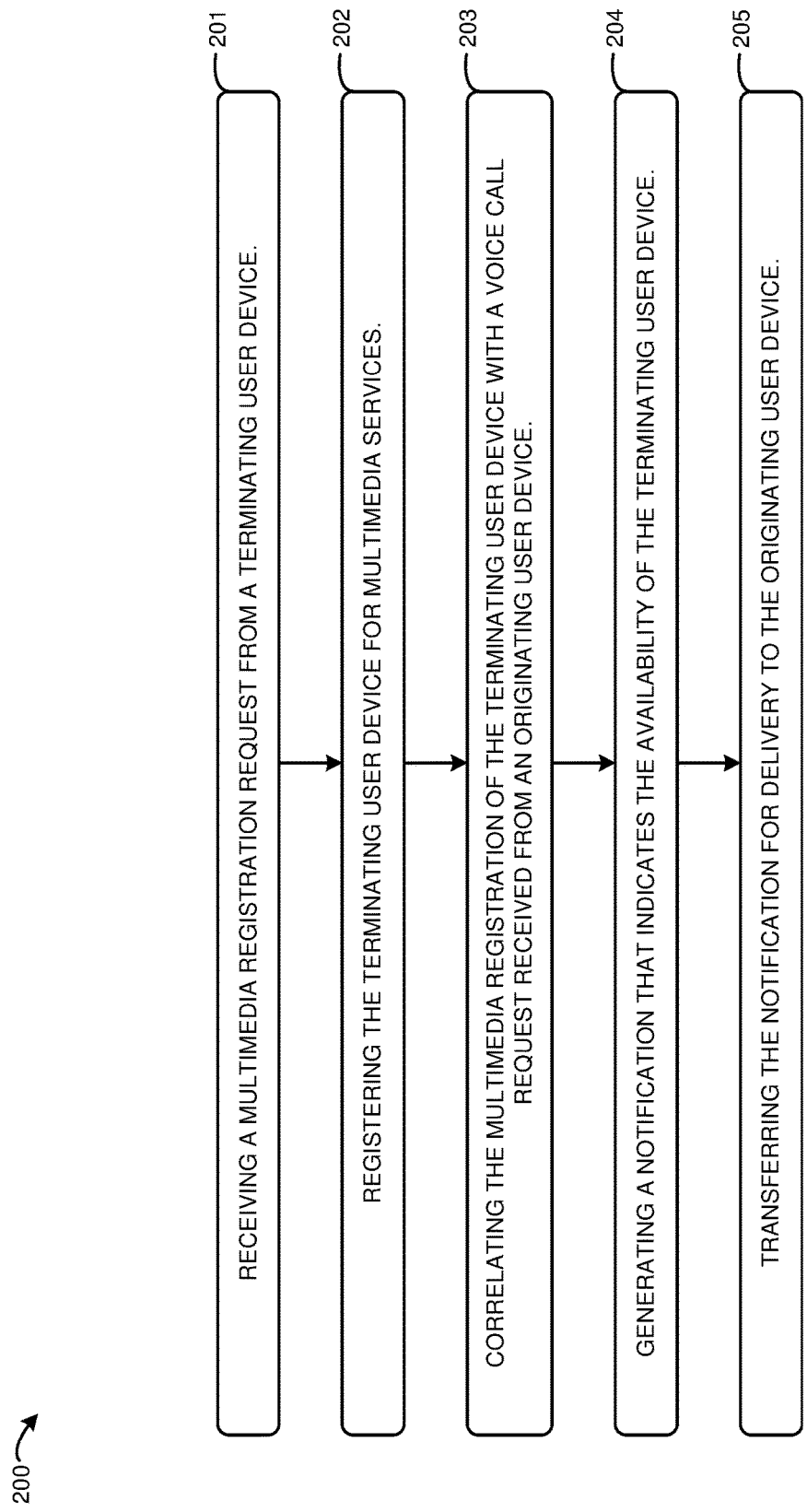
FIG. 2 illustrates an exemplary operation of the wireless communication network to notify the calling user device of the multimedia availability for the called user device.

FIG. 2 illustrates process 200. Process 200 comprises an exemplary operation of wireless communication network 100 to notify user devices of user availability. The operation may vary in other examples. The operations of process 200 comprise receiving a multimedia registration request from a terminating user device (step 201). The operations further comprise registering the terminating user device for multimedia services (step 202). The operations further comprise correlating the multimedia registration of the terminating user device with a voice call request received from an originating user device (step 203). The operations further comprise generating a notification that indicates the availability of the terminating user device (step 204). The operations further transferring the notification for delivery to the originating user device (step 205).

Figure 3:
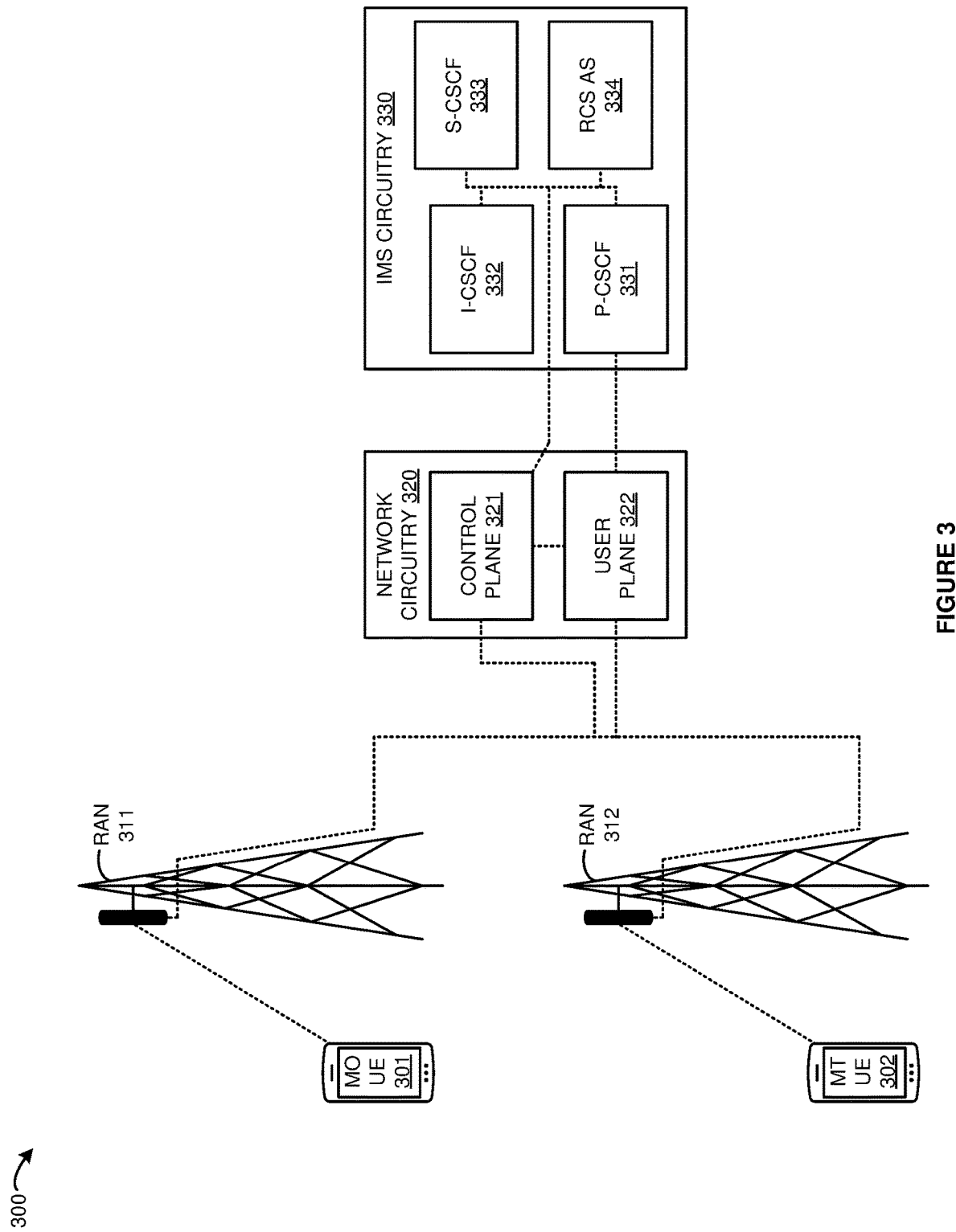
FIG. 3 illustrates a wireless communication network to notify a Mobile Originating User Equipment (MO UE) of an Internet Protocol Multimedia Subsystem (IMS) session availability for a Mobile Terminating (MT) UE.

FIG. 3 illustrates wireless communication network 300 network to notify originating User Equipment (UE) of terminating UE availability. Wireless communication network 300 is an example of wireless network 100, however network 100 may differ. Wireless communication network 300 comprises Mobile Originating (MO) UE 301, Mobile Terminating (MT) UE 301, RANs 311 and 312, network circuitry 320, and IMS circuitry 330. Network circuitry 320 comprises control plane 321 and user plane 322. IMS circuitry 330 comprises Proxy Call Session Control Function (P-CSCF) 331. Interrogating Call Session Control Function (I-CSCF) 332, Serving Call Session Control Function (S-CSCF) 333, and RCS AS 334. In other examples, wireless network 300 may comprise additional or different elements than those illustrated in FIG. 3.

In some examples, MO UE 301 attaches to network circuitry 320 over RAN 311 and registers with network circuitry 320 and IMS circuitry 330. MO UE 301 generates and transfers an IMS session request addressed for MT UE 302 to user plane 322 over RAN 311. For example, MO UE 301 may generate and transfer a Session Initiation Protocol (SIP) invite to initiate an IMS voice session with MT UE 302. User plane 322 receives the IMS session request and forwards the session request to S-CSCF 333 over P-CSCF 331. S-CSCF 333 interfaces with the other IMS functions to translate the IMS session request for MT UE 302 into an Internet Protocol (IP) address for MT UE 302. S-CSCF 333 transfers the IMS session request to user plane 322 over P-CSCF 331 and directs user plane 322 to deliver the IMS session request to the ID address for MT UE 302. User plane 322 is unable to deliver the session request to MT UE 302 and responsively notifies S-CSCF 333 over P-CSCF 331. S-CSCF 333 indicates the session request failure to MO UE 301 over network circuitry 320 and RAN 311.

Subsequently, MT UE 302 attaches to network circuitry 320 over RAN 312 and registers with network circuitry 320 and IMS circuitry 330. S-CSCF 333 determines MT UE 302 is available to participate in IMS sessions based on the registration and associates the registration of MT UE 302 with the previously sent session request from MO UE 301. S-CSCF 333 maintains an authorized list of UEs that may be notified of MT UE 302's availability. The authorized list may be generated based on user authorization, user contacts, and the like. S-CSCF 333 accesses the authorized list and identifies that MO UE 301 is authorized to be notified of MT UE 302's availability. S-CSCF 333 directs RCS AS 334 to generate an RCS text message for MO UE 301 that indicates MT UE 302's network presence. RCS AS 334 transfers the text message to user plane 322 for delivery to UE 301. User plane 322 transfers the text message to UE 301 over RAN 311 and UE 301 displays the text message to notify the user that MT UE 302 is back online.

Advantageously, wireless communication network 300 effectively notifies MO UE 301 when MT UE 302 is available to participate in a multimedia session. Moreover, the wireless communication network 300 efficiently governs which devices are allowed to be notified when MT UE 302 is available to participate in a multimedia session.

UEs 301-302 and RANs 311-312 communicate over links using wireless technologies like 5GNR, LTE, LP-WAN, WIFI, Bluetooth, and/or some other type of wireless or wireline networking protocol. The wireless technologies use electromagnetic frequencies in the low-band, mid-band, high-band, or some other portion of the electromagnetic spectrum. RANs 311-312, network circuitry 320, and IMS circuitry 330 communicate over various links that use metallic links, glass fibers, radio channels, or some other communication media. The links use Fifth Generation Core (5GC), Evolved Packet Core (EPC), IEEE 802.3 (ENET), Time Division Multiplex (TDM), Data Over Cable System Interface Specification (DOCSIS), Internet Protocol (IP), General Packet Radio Service Transfer Protocol (GTP), 5GNR, LTE, WIFI, virtual switching, inter-processor communication, bus interfaces, and/or some other data communication protocols.

UEs 301-302 may comprise phones, vehicles, computers, sensors, drones, robots, or other types of data appliances with wireless and communication circuitry. Although RANs 311-312 are illustrated as towers, RANs 311-312 may comprise other types of mounting structures (e.g., buildings), or no mounting structures at all. RANs 311-312 comprises Fifth Generation (5G) RANS, LTE RANs, gNodeBs, eNodeBs, NB-IoT access nodes, LP-WAN base stations, wireless relays, WIFI hotspots, Bluetooth access nodes, and/or other wireless network transceivers. UEs 301-302 and RANs 311-312 comprise antennas, amplifiers, filters, modulation, analog/digital interfaces, microprocessors, software, memories, transceivers, bus circuitry, and the like. Control plane 321 comprises network functions like AMF, SMF, UDM, PCF, and the like. User plane 322 comprises network functions like UPF and the like.

UEs 301-302, RANs 311-312, network circuitry 320, and IMS circuitry 330 comprise microprocessors, software, memories, transceivers, bus circuitry, and the like. The microprocessors comprise Digital Signal Processors (DSP), Central Processing Units (CPU), Graphical Processing Units (GPU), Application-Specific Integrated Circuits (ASIC), Field Programmable Gate Array (FPGA), and/or the like. The memories comprise Random Access Memory (RAM), flash circuitry, Solid State Drives (SSD), Non-Volatile Memory Express (NVMe) SSDs, Hard Disk Drives (HDDs), and/or the like. The memories store software like operating systems, user applications, radio applications, network functions, and multimedia functions. The microprocessors retrieve the software from the memories and execute the software to drive the operation of wireless communication network 300 as described herein.

Figure 4:
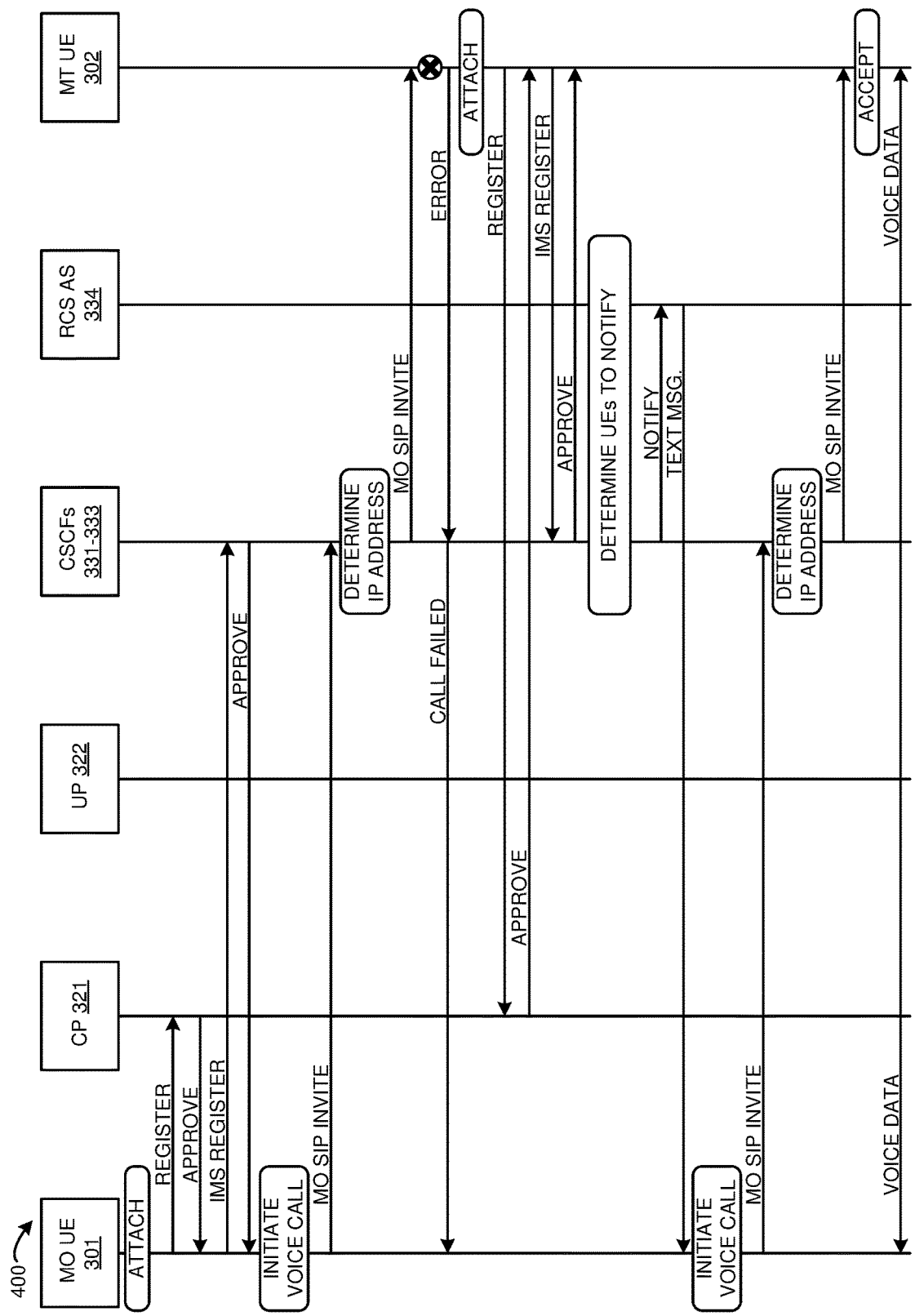
FIG. 4 illustrates an exemplary operation of the wireless communication network to notify the MO UE of the IMS session availability for the MT UE.

FIG. 4 illustrates process 400. Process 400 comprises an exemplary operation of wireless communication network 300 to notify MO UE 301 of MT UE 302's availability. The operation may vary in other examples. In some examples, MO UE 301 wirelessly exchanges attachment signaling with RAN 311. Once attached, MO UE 301 transfers a registration request to control plane (CP) 321 over RAN 311. Control plane 321 registers MO UE 301 and indicates the registration to MO UE 301. Upon registration, MO UE 301 transfers an IMS registration request to control plane 321. Control plane 321 forwards the registration request to S-CSCF 333. S-CSCF 333 interacts with P-CSCF 331, I-CSCF 332, and control plane 321 to register MO UE 301 for IMS services. S-CSCF 333 indicates the registration to MO UE 301 over control plane 321 and RAN 311.

Once registered with network circuitry 320 and IMS circuitry 330, MO UE 301 initiates a voice call with MT UE 302. MO UE 301 generates and transfers a MO SIP invite addressed for MT UE 302 to user plane (UP) 322. User plane 322 forwards the SIP invite to S-CSCF 333 over P-CSCF 331. S-CSCF 333 translates the phone number for MT UE 302 included in the SIP invite to an IP address for MT UE 302. S-CSCF 333 returns the SIP invite to user plane 322 and directs user plane 322 to deliver the SIP invite to MT UE 302 based on the IP address. At this point, MT UE 302 is set in do-not-disturb mode and is not reachable for an IMS voice call. User plane 322 attempts to deliver the SIP invite to MT UE 302. MT UE 302 responds to the SIP invite with an error message and user plane indicates the error to S-CSCF 333. S-CSCF 333 indicates the call failure to MO UE 301.

Subsequently, MT UE 302 wirelessly exchanges attachment signaling with RAN 311. Once attached, MO UE 301 transfers a registration request to control plane (CP) 321 over RAN 311. Control plane 321 registers MO UE 301 and indicates the registration to MO UE 301. Upon registration, MO UE 301 transfers an IMS registration request to control plane 321. Control plane 321 forwards the registration request to S-CSCF 333. S-CSCF 333 interacts with P-CSCF 331, I-CSCF 332, and control plane 321 to register MO UE 301 for IMS services. RCS AS 334 updates the RCS presence for MT UE 302 from unavailable to available. In response to the registration and the available RCS presence of MT UE 302, S-CSCF 333 interfaces with RCS AS 334 to determine one or more UEs authorized to be alerted if MT UE 302's network presence. RCS AS 334 maintains a data structure that indicates UEs that may be notified of MT UE 302's presence. S-CSCF 333 accesses the data structure and determines that MO UE 301 is authorized to be notified of MT UE 302's network presence. S-CSCF 333 directs RCS AS 334 to transfer an RCS message to UE 301. RCS AS 34 generates an RCS message and transfers the RCS message to UE 301 over user plane 322 and RAN 311.

In response to the RCS message indicating MT UE 302 is available for voice calling, MO UE 301 initiates another voice call with MT UE 302. MO UE 301 generates and transfers a MO SIP invite addressed for MT UE 302 to user plane 322 which forwards the SIP invite to S-CSCF 333 over P-CSCF 331. S-CSCF 333 translates the phone number for MT UE 302 included in the SIP invite to an IP address for MT UE 302. S-CSCF 333 returns the SIP invite to user plane 322 and directs user plane 322 to deliver the SIP invite to MT UE 302 based on the IP address. User plane 322 delivers the SIP invite to MT UE 302 over RAN 312. MT UE 302 accepts the SIP invite and indicates the acceptance to S-CSCF 333. S-CSCF 333 interfaces with the other IMS functions to organize the end-to-end voice call links between MO UE 301 and MT UE 302. Once the end-to-end connection is established, MO UE 301 and MT UE 302 exchange voice call data over RAN 311, user plane 322, and RAN 312.

Figure 5:
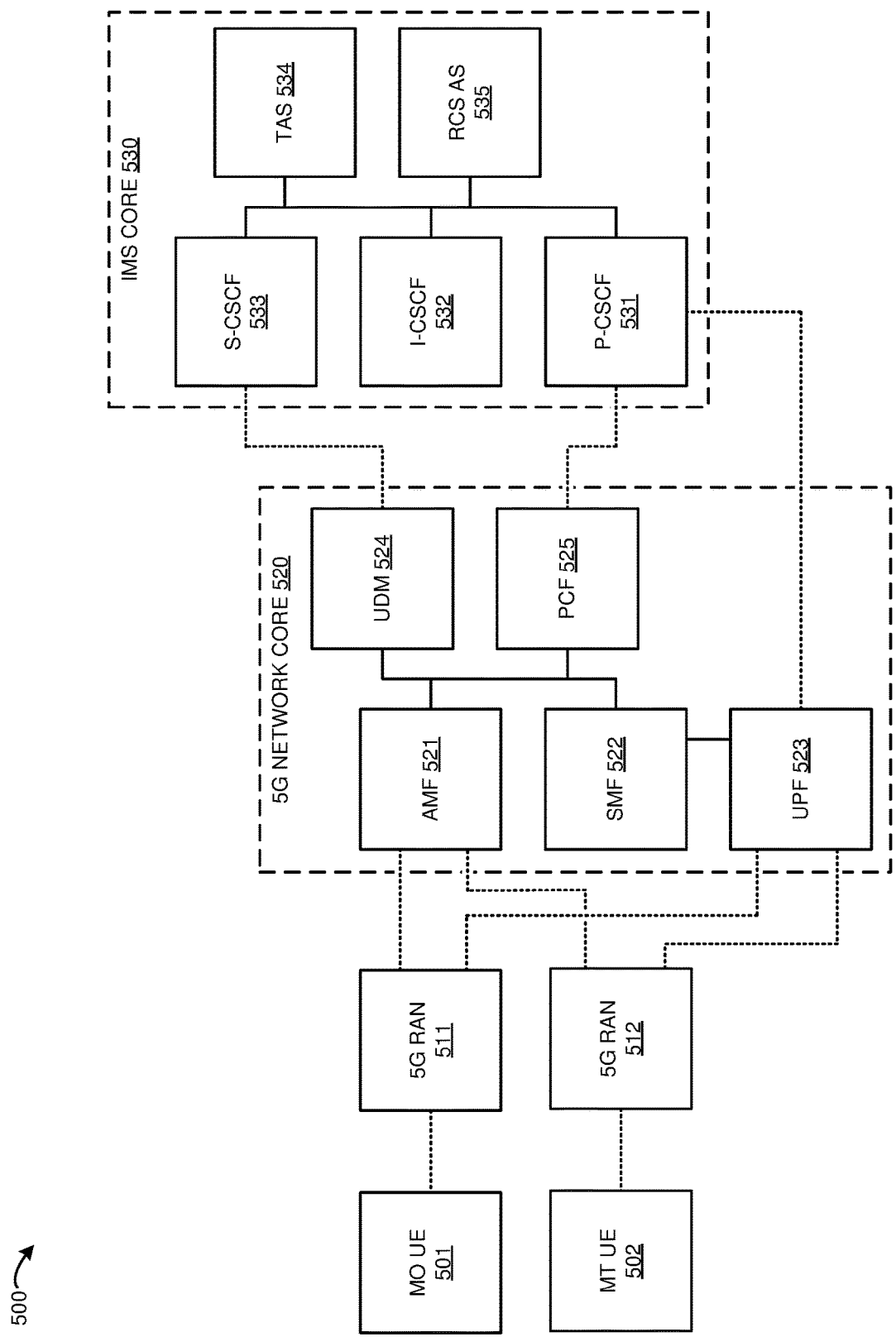
FIG. 5 illustrates a Fifth Generation (5G) wireless communication network to notify an MO UE of an IMS voice call availability for a MT UE.

FIG. 5 illustrates 5G communication network 500 to notify an MO UE of an IMS voice call availability for a MT UE. 5G communication network 500 comprises an example of wireless communication networks 100 and 300, although networks 100 and 300 may differ. 5G communication network 500 comprises MO UE 501, MT UE 502, 5G RAN 511, 5G RAN 512, 5G network core 520, and IMS core 530. 5G network core 520 comprises AMF 521, SMF 522, UPF 523, UDM 524, and PCF 525. IMS core 530 comprises P-CSCF 531, I-CSCF 532, S-CSCF 533, TAS 534, and RCS AS 535. Other network functions and network elements like Network Slice Selection Function (NSSF), Authentication Server Function (AUSF), Network Repository Function (NRF), Network Exposure Function (NEF), Application Function (AF), Uniform Data Registry (UDR) are typically present in 5G network core 520 but are omitted for clarity. In other examples, wireless network communication network 500 may comprise additional or different elements than those illustrated in FIG. 5.

MT UE 502 wirelessly attaches to RAN 512. UE 502 exchanges attachment signaling with RAN 512 to establish a connection with 5G network applications hosted by RAN 512. Once connected, UE 502 transfers a registration request for delivery to AMF 521. The registration request comprises information like a registration type, UE capabilities, requested slice types, Protocol Data Unit (PDU) session requests, and the like. RAN 512 forwards the registration request for UE 502 to AMF 521. AMF 521 transfers an identity request to UE 502 over RAN 512. UE 502 responsively indicates its identity to AMF 521 via RAN 512. Exemplary identity indications comprise Subscriber Concealed Identifier (SUCI) and Subscriber Permanent Identifier (SUPI). AMF 521 interacts with UDM 524, PCF 525, and/or other network functions to authenticate and authorize UE 502 for wireless data service.

Responsive to the authentication and authorization, AMF 521 retrieves Quality-of-Service (QOS) metrics, allowed slice identifiers, service attributes, IMS permissions, and the like from UDM 524. AMF 521 selects a network slice for UE 502. For example, AMF 521 may interface with an NSSF to select network slice ID for UE 502. AMF 521 directs SMF 522 to serve UE 502 based on the network slice, QoS metrics, service attributes, and/or other data retrieved from UDM 524. SMF 522 selects P-CSCF 531 and UPF 523 based on the service information provided by the one of UDM 524. SMF 522 indicates the network addresses for UPF 523 and P-CSCF 531 to AMF 521. AMF 521 generates UE context comprising the QoS metrics, a slice ID for the network slice, the network addresses, the service attributes, and the like. AMF 521 transfers the UE context to UE 502 over RAN 512.

UE 502 generates an IMS registration request to register with IMS core 530 based on the UE context. The registration request includes a list of authorized UEs, including MO UE 501, that may be notified of the network presence of UE 502. UE 502 uses the network address for P-CSCF 531 in the UE context to transfer the IMS registration request to UPF 523 over RAN 512. UPF 523 identifies the network address for P-CSCF 631 in the registration request and forwards the request to P-CSCF 531. P-CSCF 531 registers an IP address for UE 502 and retrieves a network address for I-CSCF 532 (e.g., by DNS query). P-CSCF 531 forwards the registration request to I-CSCF 532 using the retrieved network address. I-CSCF 532 interfaces with UDM 524 to identify available S-CSCFs. UDM 524 transfers the network address for S-CSCF 533 to I-CSCF. I-CSCF 532 forwards the registration request with the network address to S-CSCF 533. S-CSCF 533 receives the registration request, caches the list of authorized UEs, and retrieves user authentication data associated with UE 502 from UDM 524. The authentication data typically includes a random number, an authentication token, a signed result, a cipher key, and an integrity key. S-CSCF 533 uses the authentication data to verify the identity of UE 502 and register UE 502 for IMS service. S-CSCF 533 directs RCS AS 535 to update the network presence of MT UE 502 to available.

In response to the successful registration and active RCS presence, S-CSCF 533 transfers the list of authorized UEs to RCS AS 535 and directs RCS AS 535 to notify the authorized UEs of UE 502's network presence. RCS AS 535 identifies the UE 501 is authorized to be notified based on the list received from UE 502 and that UE 501 attempted to establish a multimedia session with UE 502 when UE 502 was unavailable. In response, RCS AS 535 generates an RCS message for UE 501 that indicates UE 502 is available for IMS sessions like voice or video calling. RCS AS 525 transfers the RCS message to UPF 523 over P-CSCF 531. UPF 523 delivers the RCS message to UE 501 over RAN 511. UE 501 receives the RCS message and displays the RCS message for the user.

In response to the notification indicating UE 502 is available, MO UE 501 initiates a MO IMS voice session with MT UE 502 over IMS core 530. MT UE 501 generates a SIP invite message and addresses the message for delivery to P-CSCF 531. The SIP invite message includes the phone number of MT UE 502. UE 501 transfers the SIP invite to UPF 523 over RAN 511. UPF 523 forwards the SIP invite message to P-CSCF 531 based on the address. P-CSCF 531 interfaces with I-CSCF 532 and S-CSCF 533 to deliver the SIP invite to MT UE 502. S-CSCF 533 translates the phone number for MT UE 502 into the IP address for MT UE 502. S-CSCF 632 transfers the SIP invite to P-CSCF 531 based on the IP address recorded during the registration of MT UE 502. P-CSCF 531 transfers the SIP invite to UPF 523 which delivers the SIP invite to MT UE 502 over RAN 512.

MT UE 502 receives and accepts the SIP invite. MT UE 502 indicates the acceptance to P-CSCF 531 over RAN 512 and UPF 523. P-CSCF 531 notifies S-CSCF 533. S-CSCF 533 interfaces with TAS 534 to organize and control the end-to-end Realtime Transport Protocol (RTP) connection between MO UE 501 and MT UE 502. Once the RTP link is set up, the IMS voice session may begin. MT UE 501 exchanges user data for the MO IMS voice session with UPF 523 over RAN 511. UPF 523 exchanges the user data for the MO IMS voice session with the MT UE 502 over RAN 512. S-CSCF 533 interfaces with one or more of P-CSCF 531, I-CSFC 632, TAS 534, and RCS AS 535 to monitor the MO IMS voice session and control the data flow between UE 501 and data network 641.

In some examples, S-CSCF 533 and RCS AS 535 may interface with other IMS systems in other wireless communication networks to share UE presence information and authorized user lists with the other wireless communication networks. In doing so, users with different home wireless communication networks are able to notify other users of their network presence. For example, IMS core 530 may use a Mobile Number Portability Application Programming Interface (MNP API) to distribute the authorized user list for UE 502 to other networks as well as RCS presence information for the UEs registered with IMS core 530 with other networks.

Figure 6:
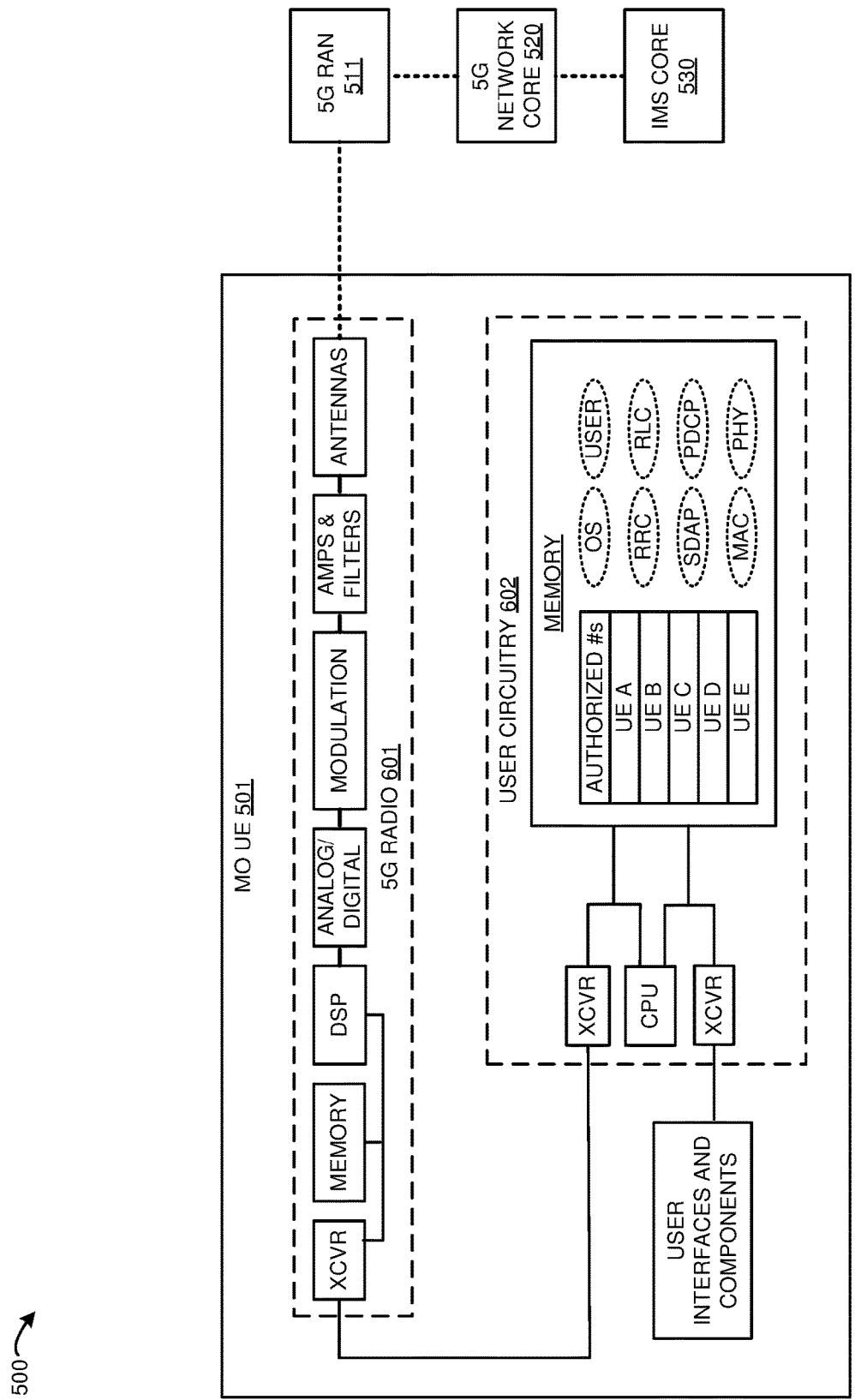
FIG. 6 illustrates a 5G UE in the 5G communication network.

FIG. 6 illustrates MO UE 501 in 5G communication network 500. UE 501 comprises an example of user device 101 illustrated in FIG. 1 and UE 301 illustrated in FIG. 3, however user device 101 and UE 301 may differ. MT UE 502 comprises a similar architecture to MO UE 501. MT UE 502 comprises an example of user device 102 illustrated in FIG. 1 and UE 302 illustrated in FIG. 3, however user device 102 and UE 302 may differ.

UE 501 comprises 5G radio 601 and user circuitry 602. Radio 601 comprises antennas, amplifiers, filters, modulation, analog-to-digital interfaces, Digital Signal Processors (DSP), memory, and transceivers (XCVRs) that are coupled over bus circuitry. User circuitry 602 comprises memory, CPU, user interfaces and components, and transceivers that are coupled over bus circuitry. The memory in user circuitry 602 stores an operating system (OS), user applications (USER), and 5GNR network applications for Physical Layer (PHY), Media Access Control (MAC), Radio Link Control (RLC), Packet Data Convergence Protocol (PDCP), Service Data Adaptation Protocol (SDAP), and Radio Resource Control (RRC). The antenna in radio 601 is wirelessly coupled to 5G RAN 511 over a 5GNR link. A transceiver in radio 601 is coupled to a transceiver in user circuitry 602. A transceiver in user circuitry 602 is typically coupled to the user interfaces and components like displays, controllers, and memory.

In radio 601, the antennas receive wireless signals from 5G RAN 511 that transport downlink 5GNR signaling and data. The antennas transfer corresponding electrical signals through duplexers to the amplifiers. The amplifiers boost the received signals for filters which attenuate unwanted energy. Demodulators down-convert the amplified signals from their carrier frequency. The analog/digital interfaces convert the demodulated analog signals into digital signals for the DSPs. The DSPs transfer corresponding 5GNR symbols to user circuitry 602 over the transceivers. In user circuitry 602, the CPU executes the network applications to process the 5GNR symbols and recover the downlink 5GNR signaling and data. The 5GNR network applications receive new uplink signaling and data from the user applications. The network applications process the uplink user signaling and the downlink 5GNR signaling to generate new downlink user signaling and new uplink 5GNR signaling. The network applications transfer the new downlink user signaling and data to the user applications. The 5GNR network applications process the new uplink 5GNR signaling and user data to generate corresponding uplink 5GNR symbols that carry the uplink 5GNR signaling and data.

In radio 601, the DSP processes the uplink 5GNR symbols to generate corresponding digital signals for the analog-to-digital interfaces. The analog-to-digital interfaces convert the digital uplink signals into analog uplink signals for modulation. Modulation up-converts the uplink analog signals to their carrier frequency. The amplifiers boost the modulated uplink signals for the filters which attenuate unwanted out-of-band energy. The filters transfer the filtered uplink signals through duplexers to the antennas. The electrical uplink signals drive the antennas to emit corresponding wireless 5GNR signals to 5G RAN 511 that transport the uplink 5GNR signaling and data.

RRC functions comprise authentication, security, handover control, status reporting, QoS, network broadcasts and pages, and network selection. SDAP functions comprise QoS marking and flow control. PDCP functions comprise security ciphering, header compression and decompression, sequence numbering and re-sequencing, de-duplication. RLC functions comprise Automatic Repeat Request (ARQ), sequence numbering and resequencing, segmentation and resegmentation. MAC functions comprise buffer status, power control, channel quality, Hybrid ARQ (HARQ), user identification, random access, user scheduling, and QoS. PHY functions comprise packet formation/deformation, windowing/de-windowing, guard-insertion/guard-deletion, parsing/de-parsing, control insertion/removal, interleaving/de-interleaving, Forward Error Correction (FEC) encoding/decoding, channel coding/decoding, channel estimation/equalization, and rate matching/de-matching, scrambling/descrambling, modulation mapping/de-mapping, layer mapping/de-mapping, precoding, Resource Element (RE) mapping/de-mapping, Fast Fourier Transforms (FFTs)/Inverse FFTs (IFFTs), and Discrete Fourier Transforms (DFTs)/Inverse DFTs (IDFTs). SIP functions comprise generating SIP invite messages and processing received SIP messages.

In some examples, UE 501 and 502 may maintain a list of authorized users that can be notified when UE 501 and 502 become available to participate in IMS multimedia sessions. When registering with IMS core 530, UEs 501 and 502 may share their authorized user lists with IMS core 530 so that IMS core 530 may notify the authorized users of the availability of UEs 501 or 502. The authorized user list may be user define or may be created automatically. For example, the RRC in UE 501 may generate the authorized user list based on the contact list of UE 501. Alternatively, UE 501 may prompt the user to approve select contacts to create the authorized list. In this example, the authorized list is stored by user circuitry 602 in memory and comprises a set of phone numbers that UE 501 automatically contacts when UE 501 becomes available to participate in voice sessions. For example, UE 502 may be powered off and therefore unable to answer voice call requests. When UE 502 is in a powered down state, UE 501 attempts to call UE 502 which is then routed to a voice mail server. Subsequently, UE 502 turns on and receives an indication (e.g., voicemail) from the voice mail server indicating UE 501 attempted to call UE 502. In response to the missed call indication, UE 502 accesses its authorized UE list and determines UE 501 is allowed to be notified of UE 502's network availability. UE 502 transfers a text message for delivery to UE 501 based on the missed call from UE 501 and UE 501's presence on the authorized list. In doing so, UE 502 selectively notifies other UEs when UE 502 becomes available to receive voice calls.

Figure 7:
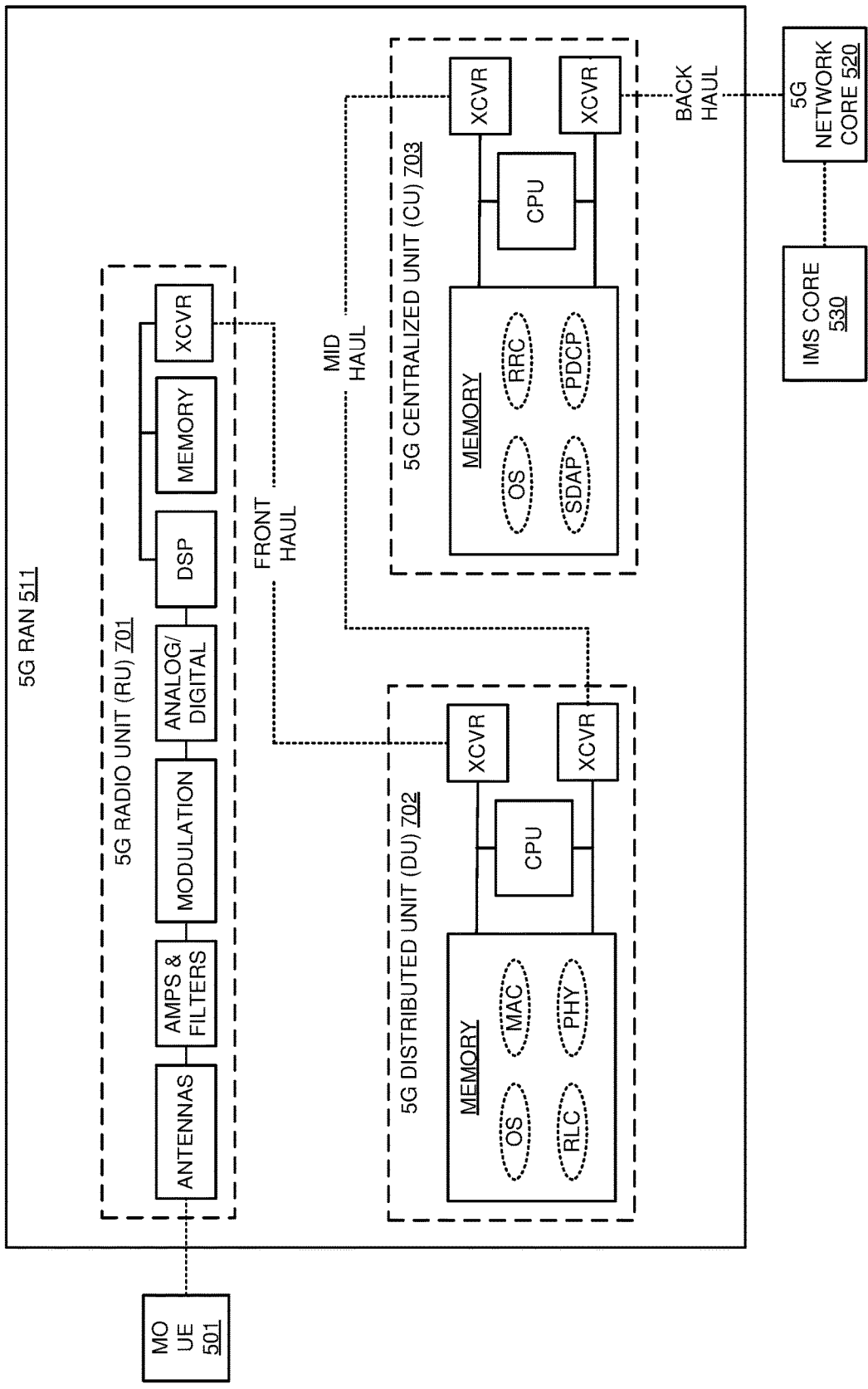
FIG. 7 illustrates a 5G Radio Access Network (RAN) in the 5G wireless communication network.

FIG. 7 illustrates 5G RAN 511 in 5G communication network 500. RAN 511 comprises Radio Unit (RU) 701, Distributed Unit (DU) 702, and Centralized Unit (CU) 703. RAN 511 comprises an example of access network 111 illustrated in FIG. 1 and RAN 311 illustrated in FIG. 3, however access network 111 and RAN 311 may differ. 5G RAN 512 comprises a similar architecture to 5G RAN 511. 5G RAN 512 comprises an example of access network 112 illustrated in FIG. 1 and RAN 312 illustrated in FIG. 3, however access network 112 and RAN 312 may differ.

RU 701 comprises antennas, amplifiers, filters, modulation, analog-to-digital interfaces, DSP, memory, and transceivers (XCVRs) that are coupled over bus circuitry. UE 501 is wirelessly coupled to the antennas in RU 701 over 5GNR links. Transceivers in 5G RU 701 are coupled to transceivers in 5G DU 702 over fronthaul links like enhanced Common Public Radio Interface (eCPRI). The DSPs in RU 701 executes their operating systems and radio applications to exchange 5GNR signals with UE 501 and to exchange 5GNR data with DU 702.

For the uplink, the antennas receive wireless signals from UE 501 that transport uplink 5GNR signaling and data. The antennas transfer corresponding electrical signals through duplexers to the amplifiers. The amplifiers boost the received signals for filters which attenuate unwanted energy. Demodulators down-convert the amplified signals from their carrier frequencies. The analog/digital interfaces convert the demodulated analog signals into digital signals for the DSPs. The DSPs transfer corresponding 5GNR symbols to DU 702 over the transceivers.

For the downlink, the DSPs receive downlink 5GNR symbols from DU 702. The DSPs process the downlink 5GNR symbols to generate corresponding digital signals for the analog-to-digital interfaces. The analog-to-digital interfaces convert the digital signals into analog signals for modulation. Modulation up-converts the analog signals to their carrier frequencies. The amplifiers boost the modulated signals for the filters which attenuate unwanted out-of-band energy. The filters transfer the filtered electrical signals through duplexers to the antennas. The filtered electrical signals drive the antennas to emit corresponding wireless signals to UE 501 that transport the downlink 5GNR signaling and data.

DU 702 comprises memory, CPU, and transceivers that are coupled over bus circuitry. The memory in 5G DU 702 stores operating systems and 5GNR network applications like PHY, MAC, and RLC. CU 703 comprises memory, CPU, and transceivers that are coupled over bus circuitry. The memory in CU 703 stores an operating system and 5GNR network applications like PDCP, SDAP, and RRC. Transceivers in 5G DU 702 are coupled to transceivers in RU 701 over front-haul links. Transceivers in DU 702 are coupled to transceivers in CU 703 over mid-haul links. A transceiver in CU 703 is coupled to network core 520 over backhaul links.

RLC functions comprise ARQ, sequence numbering and resequencing, segmentation and resegmentation. MAC functions comprise buffer status, power control, channel quality, HARQ, user identification, random access, user scheduling, and QoS. PHY functions comprise packet formation/deformation, guard-insertion/guard-deletion, parsing/de-parsing, control insertion/removal, interleaving/de-interleaving, FEC encoding/decoding, channel coding/decoding, channel estimation/equalization, and rate matching/de-matching, scrambling/descrambling, modulation mapping/de-mapping, layer mapping/de-mapping, precoding, RE mapping/de-mapping, FFTs/IFFTs, and DFTs/

IDFTs. PDCP functions include security ciphering, header compression and decompression, sequence numbering and re-sequencing, de-duplication. SDAP functions include QoS marking and flow control. RRC functions include authentication, security, handover control, status reporting, QoS, network broadcasts and pages, and network selection.

Figure 8:
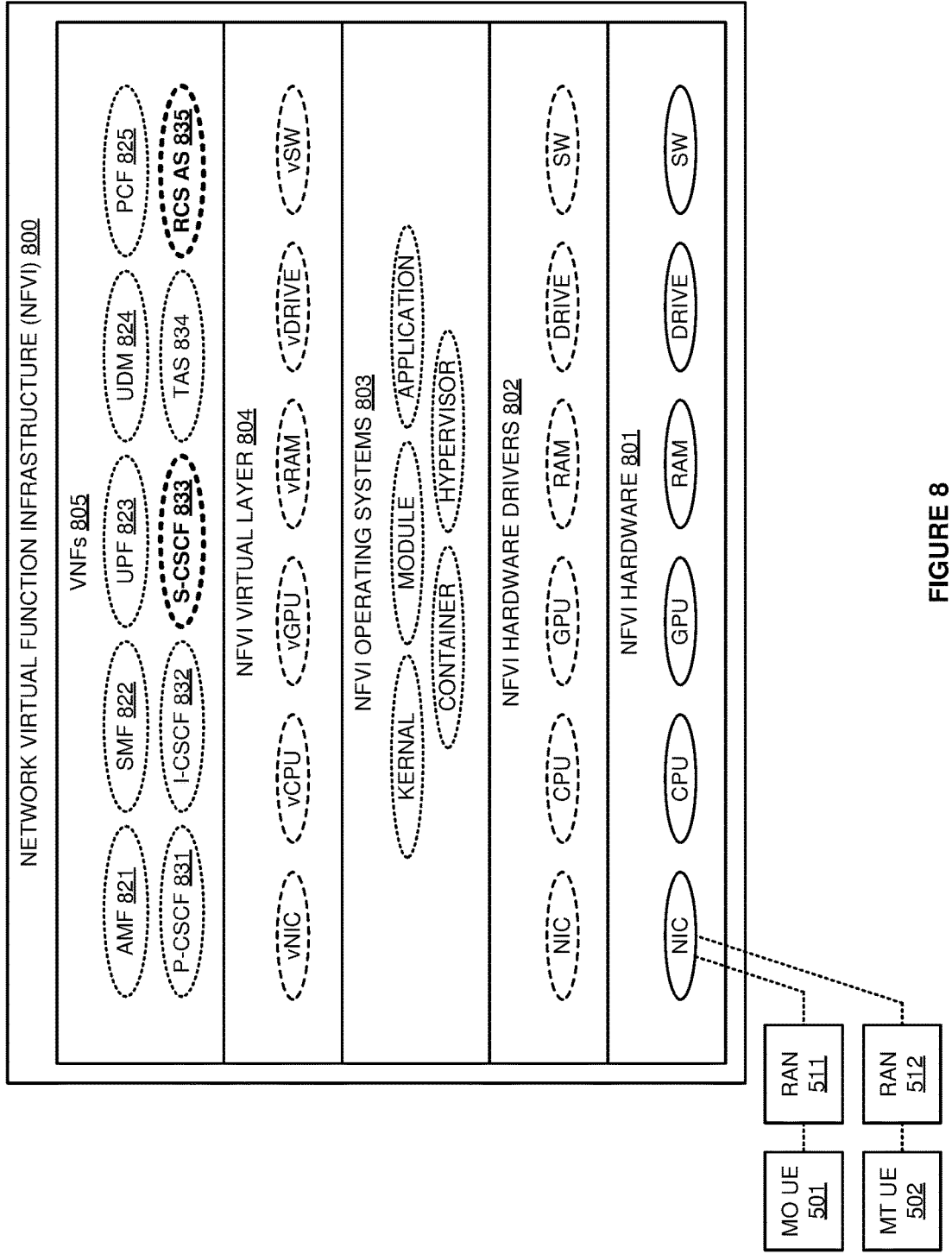
FIG. 8 illustrates a Network Function Virtualization Infrastructure (NFVI) in the 5G wireless communication network.

FIG. 8 illustrates Network Function Virtualization Infrastructure (NFVI) 800. NFVI 800 comprises an example of core network 121 and multimedia system 131 illustrated in FIG. 1 and network circuitry 320 and IMS circuitry 330 illustrated in FIG. 3, although core network 121, multimedia system 131, network circuitry 320, and IMS circuitry 330 may differ. NFVI 800 comprises NFVI hardware 801, NFVI hardware drivers 802, NFVI operating systems 803, NFVI virtual layer 804, and NFVI Virtual Network Functions (VNFs) 805. NFVI hardware 801 comprises Network Interface Cards (NICs), CPU, GPU, RAM, Flash/Disk Drives (DRIVE), and Data Switches (SW). NFVI hardware drivers 802 comprise software that is resident in the NIC, CPU, GPU, RAM, DRIVE, and SW. NFVI operating systems 803 comprise kernels, modules, applications, containers, hypervisors, and the like. NFVI virtual layer 804 comprises vNIC, vCPU, vGPU, vRAM, vDRIVE, and vSW. NFVI VNFs 805 comprise AMF 821, SMF 822, UPF 823, UDM 824, PCF 825, P-CSCF 831, I-CSCF 832, S-CSCF 833, TAS 834, and RCS AS 835. Additional VNFs and network elements like AUSF, NSSF, NEF, NRF, UDR, and HSS are typically present but are omitted for clarity. NFVI 800 may be located at a single site or be distributed across multiple geographic locations. For example, a first portion of NFVI 800 may be located at a first geographic location dedicated to the network functions in 5G network core 520 while a second portion of NFVI 800 may be located at a second geographic location dedicated to the IMS functions in IMS core 530. The NIC in NFVI hardware 801 is coupled to RAN 511 and RAN 512. NFVI hardware 801 executes NFVI hardware drivers 802, NFVI operating systems 803, NFVI virtual layer 804, and NFVI VNFs 805 to form AMF 521, SMF 522, UPF 523, UDM 524, PCF 525, P-CSCF 531, I-CSCF 532, S-CSCF 533, TAS 534, and RCS AS 535.

Figure 9:
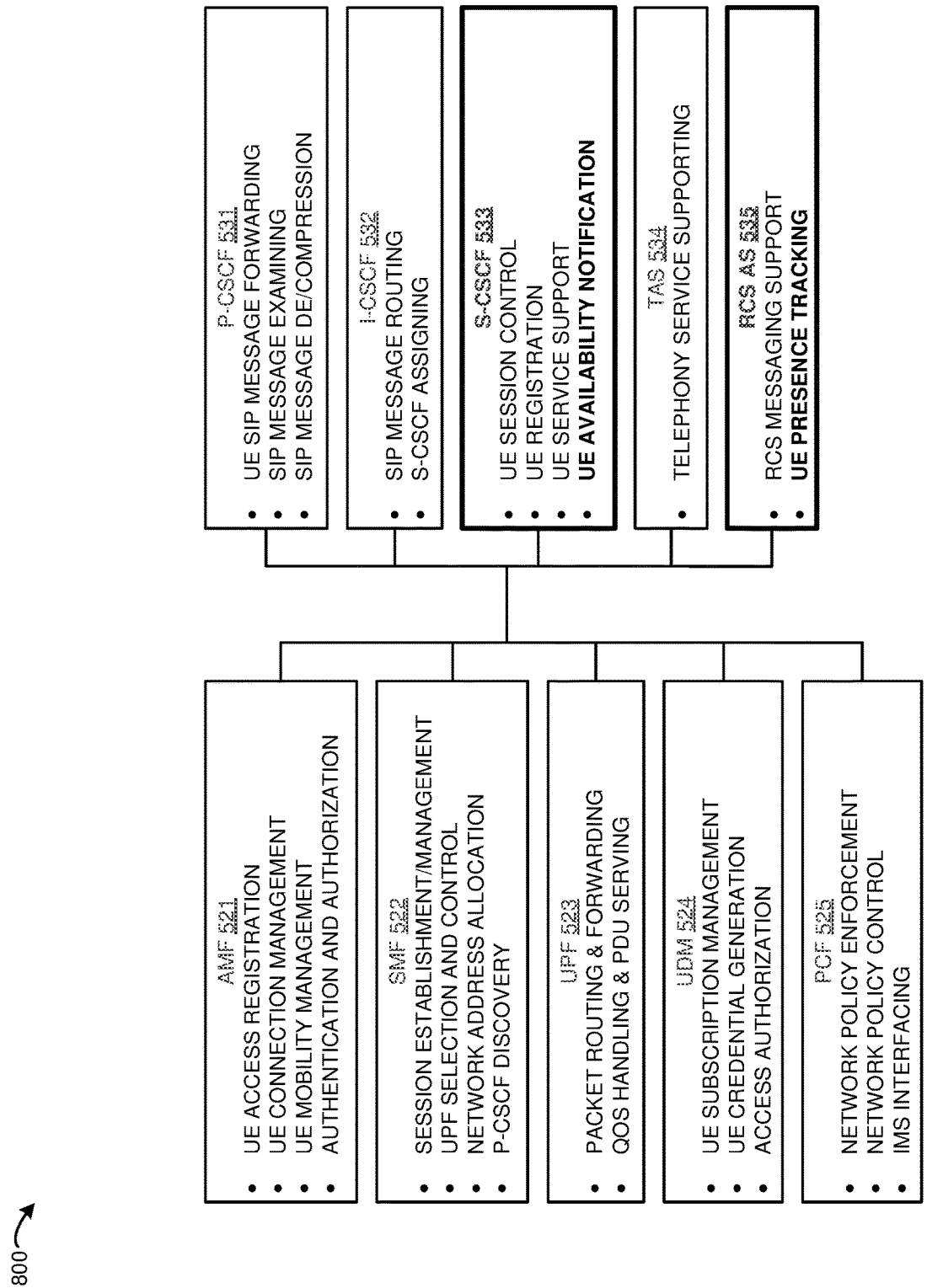
FIG. 9 further illustrates the NFVI in the 5G wireless communication network.

FIG. 9 further illustrates NFVI 800 in 5G communication network 500. AMF 521 performs UE access registration, UE connection management, UE mobility management, and authentication and authorization. SMF 522 performs session establishment and management, UPF selection and control, network address allocation, and P-CSCF discovery. UPF 523 performs packet routing and forwarding, QoS handling, and PDU serving. UDM 524 performs UE subscription management, UE credential generation, access authorization, and IMS registration support. PCF 525 performs network policy enforcement, network policy control, and IMS interfacing. P-CSCF 531 performs UE SIP message forwarding, SIP message examining, and SIP message compression/decompression. I-CSCF 532 performs SIP message routing and S-CSCF assigning. S-CSCF 533 performs UE session control, UE registration, UE service supporting, and UE availability notification. TAS 534 performs telephony service supporting. RCS AS 535 performs RCS messaging support and UE presence tracking.

In some examples, P-CSCF 631 receives an MO SIP invite generated by MO UE 501 over UPF 523 for MT UE 502. P-CSCF 531 forwards the SIP invite to S-CSCF 533 to determine where to deliver the message. S-CSCF 533 processes the public Uniform Resource Indicator (URI) included in the SIP invite to translate the URI into a registered IP address for MT UE 502. At this point, MT UE 502 is unavailable for voice calling and is not registered with IMS core 530. Since MT UE 502 is not registered, S-CSCF 533 is unable to translate the URI for UE 502 into a registered IP address for UE 502. Consequently, S-CSCF 533 determines MT UE 502 is not reachable. S-CSCF 533 generates and transfers a call failed indication for UE 501 to P-CSCF 531. P-CSCF 531 transfers the call failed message to UPF 523 which delivers the message to UE 501 over RAN 511. S-CSCF 533 directs RCS AS 535 to cache the call failed message in association with an identifier for UE 501.

Subsequently, UE 502 attaches to network core 520 and UPF 523 receives an IMS registration request generated by UE 502 and forwards the request to P-CSCF 531. P-CSCF 531 receives the registration request and assigns an IP address for UE 502 to route calls to. P-CSCF 531 forwards the registration request to I-CSCF 532 using the retrieved network address. I-CSCF 532 interfaces with UDM 524 to identify S-CSCF 533 and forwards the registration request to S-CSCF 533. S-CSCF 533 receives the registration request and retrieves user authentication data associated with UE 502 from UDM 524. S-CSCF 533 uses the authentication data to register UE 502 with IMS core 530.

In response to the successful registration, RCS AS 535 updates the presence of UE 502 from not-available to available. RCS AS 535 transfers a request for allowed UEs to notify to UDM 524. UDM 524 accesses the subscriber profile for UE 502 to determine other UEs that may be notified of UE 502's call availability. UDM 524 indicates the authorized UEs, including MO UE 501, to RCS AS 535. RCS AS 535 generates a text message notification for UE 501 based on the allowability and the cached call failed message for UE 501. RCS AS 535 transfers the notification to S-CSCF 533. S-CSCF 533 directs P-CSCF 533 to deliver the notification to UE 501. P-CSCF 531 identifies the registered IP address for UE 501 and transfers the notification to UE 501 over UPF 523 and RAN 511.

UPF 523 receives a MO SIP invite message generated by MO UE 501 for MT UE 502 and transfers the SIP invite P-CSCF 531. P-CSCF 531 forwards the SIP invite to S-CSCF 533 to determine where to deliver the message. S-CSCF 533 processes the public URI included in the SIP invite to translate the URI into a registered IP address for MT UE 502. At this point, MT UE 502 is available for voice calling and is registered with IMS core 530. Since MT UE 502 is registered, S-CSCF 533 replaces the URI for UE 502 with the registered IP address for UE 502. S-CSCF 533 determines MT UE 502 registered with P-CSCF 531 and transfers the SIP invite with the IP address to P-CSCF 531. P-CSCF 531 transfers the SIP invite for delivery to UE 502 based on the IP address over UPF 523. MT UE 502 accepts the invite and P-CSCF 531 receives an acceptance indication generated by UE 502. P-CSCF 531 notifies S-CSCF 533 which interfaces with TAS 534 to organize the RTP connection between MO UE 501 and MT UE 502. Once the RTP link is set up, the IMS voice session begins. S-CSCF 533 interfaces with one or more of P-CSCF 531, I-CSFC 632, TAS 534, and RCS AS 535 to monitor the MO IMS voice session and control the data flow between UE 501 and data network 641.

Figure 10:
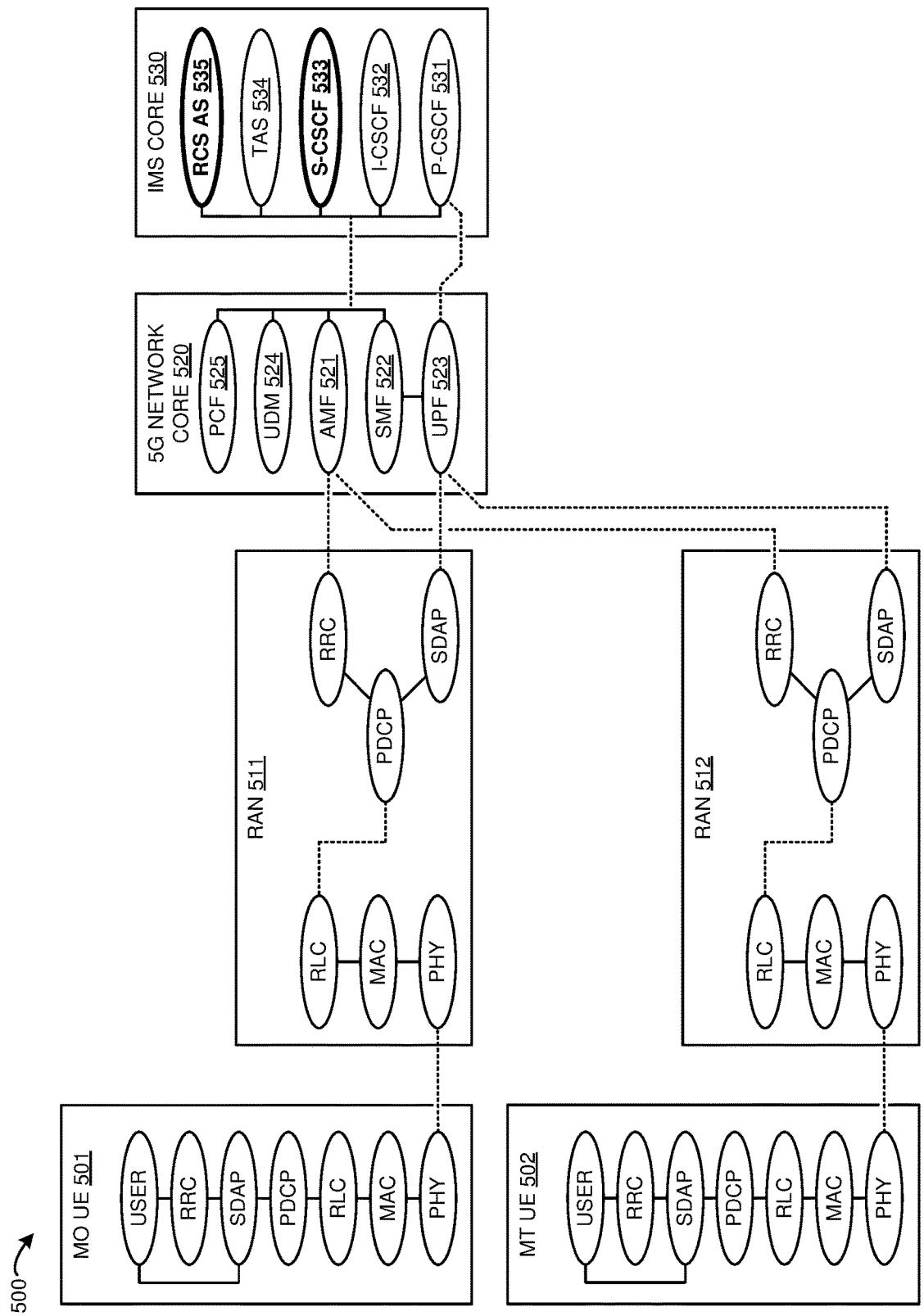
FIG. 10 illustrates an exemplary operation of the 5G wireless communication network to notify the MO UE of the IMS voice call availability for the MT UE.

FIG. 10 illustrates an exemplary operation of 5G communication network 500 to notify an MO UE of an IMS voice call availability for a MT UE. The operation may vary in other examples. In some examples, MT UE 502 camps on 5G RAN 512 in do-not-disturb mode. Subsequently, a user application in MT UE 502 executes and MT UE 502 exits do-not-disturb mode. The RRC in UE 502 exchanges attachment signaling with RAN 512 to reestablish an active connection with the 5G network applications hosted by RAN 512. The RRC in RAN 512 receives the attachment signaling and notifies AMF 521 that MT UE 502 has exited do-not-disturb mode. The RRC in UE 502 drives the user application to generate a SIP notification for IMS core 530 to receive any missed call notifications for calls sent to MT UE 502 when MT UE 502 was in do not disturb mode. The user application generates a SIP notification and the SDAP in UE 502 transfers the SIP notification to the SDAP in RAN 512 over the PDCPs, RLCs, MACs, and PHYs. The SDAP in RAN 512 transfers the SIP notification to P-CSCF 531 over UPF 523. P-CSCF 531 interfaces with S-CSCF 533 to determine if any calls were sent to MT UE 502 while MT UE 502 was unreachable. For example, S-CSCF 533 may access a voice mail application server in IMS core 530 to determine if any voice mails were left for MT UE 502.

S-CSCF 533 determines UE 502 missed a call from MO UE 501 and drives P-CSCF 531 to transfer the missed call notification to UE 502. P-CSCF 531 transfers the notification to UPF 523. UPF 523 forwards to the notification to the SDAP in RAN 512 which transfers the notification to the SDAP over the PDCPs, RLCs, MACs, and PHYs. The SDAP in UE 502 notifies the RRC. In response to the missed call notification, the RRC accesses its table of allowed UEs for notification of UE 502's network presence. The RRC determines UE 501 may be notified based on the allowed UE table and generates a text message (e.g., an RCS or SMS message) for UE 501 to notify UE 501 that UE 502 is available for voice calling. The RRC transfers the text message in Non-Access Stratum (NAS) signaling to the RRC in RAN 512 over the PDCPs, RLCs, MACs, and PHYs. The RRC in RAN 512 delivers the text message to AMF 521. AMF 521 identifies the text message is intended for UE 501 which is camped on RAN 511 and transfers the text message to the RRC in RAN 511 over NAS signaling. For example, AMF 521 may interface with Short Message Service Function (SMSF) in network core 520 to deliver the text message to UE 501. The RRC in RAN 511 forwards the text message to the RRC in UE 501. The RRC in UE 501 drives the user circuitry to display the text message indicating UE 502's availability to the user.

In response to the notification indicating UE 502 is available, a user application in MO UE 501 executes to initiates a MO IMS voice session with MT UE 502. The user application generates an MO SIP invite for MT UE 502. The RRC drives the SDAP to transfer the SIP invite for MT UE 502 to the SDAP in RAN 511 over the PDCPs, RLCs, MACs, and PHYs. The SDAP in RAN 511 transfers the SIP invite to P-CSCF 531 over UPF 523. P-CSCF 531 indicates the SIP invite to S-CSCF 533 which translates the URI for MT UE 502 included into the SIP invite into the registered IP address for MT UE 502. S-CSCF 632 replaces the URI with the IP address and returns the SIP invite to P-CSCF 531. P-CSCF 531 transfers the SIP invite to the SDAP in RAN 512 over UPF 523 based on the IP address. The SDAP in RAN 512 transfers the SIP invite to the SDAP in UE 502 over the PDCPs, RLCs, MACs, and PHYS.

The SDAP in UE 502 receives and accepts the SIP invite. The SDAP indicates the acceptance to P-CSCF 531 over RAN 512 and UPF 523. P-CSCF 531 notifies S-CSCF 533 which interfaces with TAS 534 to organize and control the end-to-end RTP connection between MO UE 501 and MT UE 502. Once the RTP link is established, the IMS voice session may begin. The SDAP in MT UE 501 exchanges user data for the MO IMS voice session with the SDAP in RAN 511 over the PDCPs, RLCs, MACs, and PHYs. The SDAP in RAN 511 exchanges the user data with UPF 523. UPF 523 exchanges the user data with the SDAP in RAN 512. The SDAP in RAN 512 exchanges the user data with the SDAP in MT UE 502 over the PDCPs, RLCs, MACs, and PHYs. S-CSCF 533 interfaces with one or more of P-CSCF 531, I-CSFC 632, TAS 534, and RCS AS 535 to monitor the MO IMS voice session and control the data flow between UE 501 and data network 641.

The wireless data network circuitry described above comprises computer hardware and software that form special-purpose network circuitry to notify a calling user device of a multimedia availability for a called user device. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose network circuitry to notify a calling user device of a multimedia availability for a called user device.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating a wireless communication network to notify user devices of user availability, the method comprising:
   receiving a multimedia registration request from a terminating user device and registering the terminating user device for multimedia services;
   correlating the multimedia registration of the terminating user device with a multimedia session request for the terminating user device received from an originating user device prior to receiving the multimedia registration request from the terminating user device;

accessing an authorized list for the terminating user device that indicates a set of allowed user devices allowed to indicate the availability of the terminating user device; and determining the originating user device comprises an allowed user device and responsively transferring a notification for delivery to the originating user device that indicates an availability of the terminating user device.

2. The method of claim 1 further comprising:

prior to registering the terminating user device, receiving the multimedia session request from the originating user device for the terminating user device;

determining that the multimedia session cannot be established; and notifying the originating user device that the multimedia session cannot be established.

3. The method of claim 2 further comprising:

subsequent to transferring the notification, receiving a second multimedia session request from the originating user device for the terminating user device;

determining that the multimedia session can be established; and establishing the multimedia session between the originating user device and the terminating user device.

4. The method of claim 3 wherein establishing the multimedia session between the originating user device and the terminating user device comprises establishing one of a voice call or a video call between the originating user device and the terminating user device.

5. The method of claim 1 further comprising:

determining a Rich Communication Services (RCS) presence for the terminating user device; and determining the availability of the terminating user device based on the RCS presence and the registration.

6. The method of claim 1 wherein the notification comprises a Rich Communication Services (RCS) text message.

7. The method of claim 1 wherein the notification comprises a Short Message Service (SMS) text message.

8. A wireless communication network to notify user devices of user availability, the wireless communication network comprising:

multimedia circuitry that:

receives a multimedia registration request from a terminating user device and registers the terminating user device for multimedia services;

correlates the multimedia registration of the terminating user device with a multimedia session request for the terminating user device received from an originating user device prior to reception of the multimedia registration request from the terminating user device;

accesses an authorized list for the terminating user device that indicates a set of allowed user devices allowed to indicate the availability of the terminating user device; and determines the originating user device comprises an allowed user device and responsively transfers a notification for delivery to the originating user device that indicates an availability of the terminating user device.

9. The wireless communication network of claim 8 wherein the multimedia circuitry further:

receives the multimedia session request from the originating user device for the terminating user device prior to registering the terminating user device;

determines that the multimedia session cannot be established; and notifies the originating user device that the multimedia session cannot be established.

10. The wireless communication network of claim 9 wherein the multimedia circuitry further:

receives a second multimedia session request from the originating user device for the terminating user device subsequent to transferring the notification;

determines that the multimedia session can be established; and establishes the multimedia session between the originating user device and the terminating user device.

11. The wireless communication network of claim 10 wherein the multimedia session comprises one of a voice call or a video call.

12. The wireless communication network of claim 8 wherein the multimedia circuitry further:

determines a Rich Communication Services (RCS) presence for the terminating user device; and determines the availability of the terminating user device based on the RCS presence and the registration.

13. The wireless communication network of claim 8 wherein the notification comprises a Rich Communication Services (RCS) text message.

14. The wireless communication network of claim 8 wherein the notification comprises a Short Message Service (SMS) text message.

15. One or more non-transitory computer-readable storage media having program instructions stored thereon to notify user devices of user availability, wherein the program instructions, when executed by a computing system, direct the computing system to perform operations, the operations comprising:

receiving a multimedia registration request from a terminating user device and registering the terminating user device for multimedia services;

correlating the multimedia registration of the terminating user device with a multimedia session request for the terminating user device received from an originating user device prior to receiving the multimedia registration request from the terminating user device;

accessing an authorized list for the terminating user device that indicates a set of allowed user devices allowed to indicate the availability of the terminating user device; and determining the originating user device comprises an allowed user device and responsively transferring a notification for delivery to the originating user device that indicates an availability of the terminating user device.

16. The non-transitory computer-readable storage media of claim 15, wherein the operations further comprise:

prior to registering the terminating user device, receiving the multimedia session request from the originating user device for the terminating user device;

determining that the multimedia session cannot be established; and notifying the originating user device that the multimedia session cannot be established.

17. The non-transitory computer-readable storage media of claim 16, wherein the operations further comprise:

subsequent to transferring the notification, receiving a second multimedia session request from the originating user device for the terminating user device;

determining that the multimedia session can be established; and establishing the multimedia session between the originating user device and the terminating user device.

18. The non-transitory computer-readable storage media of claim 17 wherein establishing the multimedia session between the originating user device and the terminating user device comprises establishing one of a voice call or a video call between the originating user device and the terminating user device.

19. The non-transitory computer-readable storage media of claim 15, wherein the operations further comprise:

determining a Rich Communication Services (RCS) presence for the terminating user device; and determining the availability of the terminating user device based on the RCS presence and the registration.

20. The non-transitory computer-readable storage media of claim 15 wherein the notification comprises one of a Rich Communication Services (RCS) text message or a Short Message Service (SMS) text message.

\* \* \* \* \*